Aug. 18, 1959   J. C. ALLEN ET AL   2,900,517
PRODUCTIVITY WELL LOGGING
Filed Dec. 8, 1955
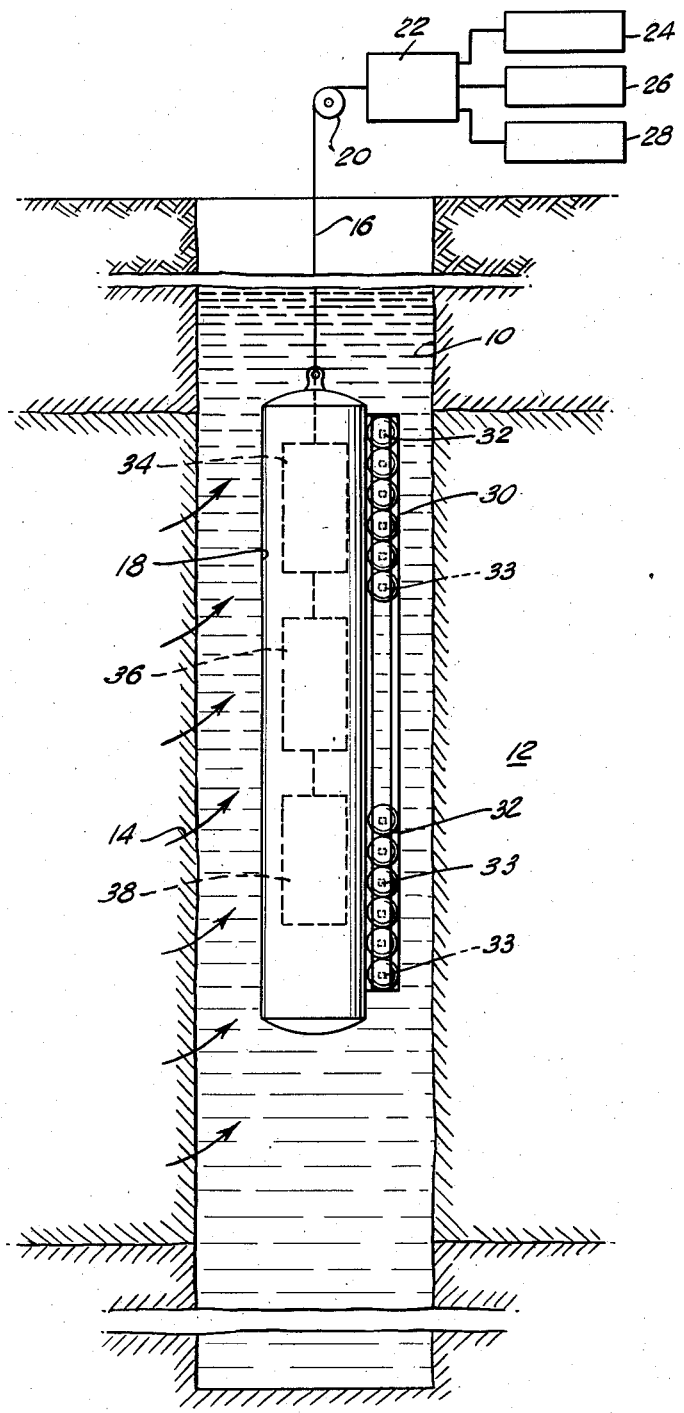

United States Patent Office 2,900,517
Patented Aug. 18, 1959

2,900,517

PRODUCTIVITY WELL LOGGING

Joseph C. Allen, Bellaire, and Ralph C. Reynolds, Houston, Tex., assignors to Texaco Inc., a corporation of Delaware Application December 8, 1955, Serial No. 551,755

8 Claims. (Cl. 250—83)

This invention relates to oil-well production and more particularly to a method and an apparatus by means of which a determination can be made as to the nature of a fluid or fluids flowing into the bore hole from one or more producing zones or formations traversed by that bore hole. By conducting the measuring operation continuously throughout the bore hole or a portion thereof a log or record can be made showing the location of those zones or formations from which gas, oil or water or mixtures of these fluids are flowing into the bore hole. Such a record is frequently termed a productivity log.

In oil-well production it is very desirable to know the depth and the vertical thickness of a formation from which fluid is flowing into the hole. It is of course equally desirable to know the nature of that fluid, i.e., whether it is gas, oil or water or a mixture of two or all three of these fluids. Thus, if it is found that water is entering the hole at a particular depth, remedial steps can be taken to stop this flow by cementing or plugging the formation at that point. In the case of oil it is likewise very desirable to ascertain the exact location of the producing zone or formation so that suitable producing apparatus and equipment can be used at the proper location, so that water can be plugged off from formations above or below the oil producing zone, etc. Again it may be found desirable to increase the permeability of the oil producing formation as by treating it with acid to increase the oil flow. In order to be sure that all of the acid is confined to the actual zone which it is desired to treat, it is naturally necessary to know the exact location of that zone.

In accordance with the invention, a method and an apparatus have been devised which make it possible to detect the point or depth at which a fluid of density different from that in the well bore is entering the hole, and it is also possible to determine the average density of the fluid in the well bore at any point above or below the producing zone or point of invasion. The apparatus to be described can be considered self-calibrating and requires a minimum of equipment at the surface. The surface record can be made on any arbitrary scale and information from the record or log can be readily converted into absolute densities if desired.

In carrying out the invention in one form a number of spheres of equal volume but of progressively different densities are arranged in a vertical cage with the lightest of the spheres on top. When this device is immersed in a fluid where the density of the fluid is increasing, one or more of the lighter spheres will move to a position nearer the top of the cage and this movement from the lower to the higher position in the cage may be detected or measured by suitable means. In one embodiment each of the spheres contains a small amount of a radioactive material and one or more detectors of radiation are arranged vertically alongside of the cage. Thus a detector near the top of the cage will show an increase in response when some of the spheres move toward the top of the cage and thus closer to the detector. Likewise a detector located near the bottom of the cage will show a decreasing response as the density of the surrounding fluid increases, thus causing the spheres to move from the bottom to the top of the cage. A third detector disposed intermediate the top and bottom of the cage will respond to radiation from a sphere or spheres moving past such a detector either upwardly or downwardly. It is of course possible to use a single sphere but the range and resolution of such an instrument will naturally not be as good as in the case where a plurality of spheres differing from each other but slightly in density are used.

For a better understanding of the invention reference may be had to the accompanying drawing in which the single figure is a vertical elevation through a portion of a well bore hole in which an instrument embodying the invention is shown as suspended opposite a producing zone or formation.

Referring to the drawing a well bore hole 10 is shown as traversing several subsurface formations including the formation 12 which will be considered as a "producing" formation, i.e., one from which some fluid such as gas, oil or water or mixtures of any of these fluids are entering the bore hole as indicated by the arrows 14. It is, of course, quite possible that a gas may be entering the hole from the upper part or zone of the formation and oil or water from a lower zone. Again, the formation may be producing all three liquids from different zones. Although the bore hole is not shown as provided with a well casing, it is understood that such a casing may be present and if so that portion of the casing within the formation 12 will have been provided with perforations to permit the fluid or fluids to enter the hole.

Shown as suspended within the bore hole 10 from a conductor cable 16 is a fluid density measuring instrument indicated generally by the elongated housing or shell 18. The cable 16 passes over a suitable reel or measuring drum 20 at the surface, which, in any well-known manner indicates or records the amount of cable in the hole and thus the depth of the instrument 18 at any time. The cable passes from the drum 20 to a suitable amplifier 22 which is connected in turn to one or more recorders, three being shown in this instance and designated by the ordinals 24, 26 and 28.

Within the bore hole and preferably attached to the exterior of the instrument housing 18 is an elongated cage 30 which may be formed of a plurality of wires or rods in a cylindrical arrangement. Disposed within the cage 30 is a plurality of spheres 32 adapted to move freely within the cage in a vertical path. The spheres 32 have progressively increasing densities from top to bottom. In the form of the invention illustrated, the uppermost of the spheres 32 may have a density of 5 lbs. per cu. ft., the next lower sphere a density of 10 lbs. per cu. ft. and so on until the bottom or twelfth sphere would have a density of 60 lbs. per cu. ft. For purposes of illustration, we can consider a typical condition of reservoir pressure and temperature prevailing as follows: Gas—5.6 lbs. per cu. ft., Oil—43.5 lbs. per cu. ft. and Water—60 lbs. per cu. ft. As stated above, the densities of the spheres range from 5 to 60 lbs. per cu. ft. in 5 lb. per cu. ft. increments.

Each of the spheres 32 contains a small source 33 of radioactivity such as a very small amount of radium or a radioactive isotope which emit radiations such as soft or low energy gamma rays and the sources in the spheres are of equal intensity or strength. Illustrated somewhat schematically as disposed within the instrument housing 18 are a plurality, three in this instance, of gamma ray detectors 34, 36, and 38. These detectors are adapted to respond to radiation from the spheres 32 and these detectors are connected through the cable 16 and amplifier 22 to the three recorders 24, 26 and 28 respectively. The detector 34 is disposed opposite the upper end of the cage 30, the detector 38 near the lower end of the cage and the detector 36 at a point intermediate the upper and lower ends of the cage.

Assuming that it is desired to determine the nature of the fluid flowing into the well from, say, the upper portion of the formation 12 the measuring apparatus or tool which has been described would be lowered either to a depth just above the upper boundary of the formation 12, or, as shown in the drawing, to a depth opposite the upper portion of the formation. If the density of the fluid in the hole at the depth of or just below the depth of the instrument is between 30 and 35 lbs. per cu. ft., the spheres 32 would be distributed in the cage 30 as illustrated. Thus the upper six spheres, being lighter than the well fluid will position themselves at the upper end of the cage 30 while the lower six spheres, being heavier than the well fluid will remain in the bottom of the cage. With such a distribution the outputs of the detectors 34 and 38 as indicated or recorded by the recorders 24 and 28 at the surface will be substantially the same since each of these detectors will be responsive to the radiation from six of the sources 33 and the operator will know that the division is between the sixth and seventh spheres and that the bore hole fluid density at that point is therefore between 30 and 35 lbs. per cu. ft. If the instrument is then lowered slightly so that it is opposite the lower portion of the formation 12 one or more of the lower spheres 32 might then ascend into the upper portion of the cage and the operator in noting an increased intensity or output from the detector 34 and a decreased output from the detector 38 would be apprised that the fluid in the bore hole opposite the lower portion of the formation 12 was denser than in the upper portion. With a simple calibration of the apparatus the recorders 24 and 28 would show the actual density. The example which has been given would indicate that gas is flowing into the hole from the upper portion of the formation 12 while oil or water is flowing into the hole from the lower portion. As stated hereinabove, with suitable calibration the apparatus would indicate whether either of the fluids is gas, oil or water or a mixture thereof.

It is believed that the operation will be clear from the foregoing explanation. As the density of the fluid surrounding the instrument 18 increases, one of the spheres 32 will rise within the cage and the output of the detector 34 will increase. Conversely as the instrument is lowered to a position opposite a gas-bearing zone or formation the density of the fluid around the instrument at that depth will decrease and one or more of the spheres 32 will descend. The detector 34 would then show a decreased output while the detector 38 will show an increase. When one of the spheres 32 passes the intermediate detector 36, either in ascending or descending, this detector output will increase, thus apprising the operator that a change is occuring in the density of the well fluid then surrounding the instrument.

It is to be understood that the instrument which has been described and shown in the drawing is by way of example only. Thus, the device could be used with but one radiation detector which could be disposed either opposite the upper or lower portion of the cage 30. The intermediate detector 36 is not essential but provides a refinement by means of which more accurate information can be obtained. The cage 30, rather than being attached to the side of the instrument 18 can, if desired, be suspended in the hole by means of a separate cable, it merely being necessary that when a measurement is being made at least one of the radiation detectors is positioned in known relation to the cage 30, i.e., the vertical path of the spheres.

If desired, a single radiation detector can be used and moved up or down along the spheres 32 so that they can be "scanned" along the length of the cage. Means for moving the radiation detector up and down within an elongated housing in the bore hole are disclosed in U.S. Letters Patent No. 2,335,409, granted November 30, 1943, to D. G. C. Hare. Fluid levels and density gradients through the entire bore hole at static conditions are readily obtainable.

Although a plurality of spheres having progressively different densities has been described it is contemplated that a single sphere could be used, providing the density of that sphere is within the range of the fluid densities likely to be encountered. While such a device would not be as accurate or precise as that described above, the use of such a single sphere within the cage 30 could be used to notify an operator that a change in the density of the bore hole fluid is occurring as the instrument is moved from one depth to another.

The initial log can be made with spheres having densities as described above and this record would give the range of densities prevailing for any given section or depth. A more detailed and precise log could then be made throughout a chosen zone or formation by replacing the spheres with a set of spheres having differences in densities of less than 5 lbs. per cu. ft.

The effect of viscosity and velocity of flowing fluids in the bore hole can be considered negligible as long as the ratio of the bore hole diameter to the diameter of the spheres is about three or greater.

While in the foregoing description radioactivity effects have been described with reference to the means for determining the position of the sphere 32 within the cage 30, it is contemplated that use can be made of other physical effects. For example, each of the spheres could contain a very small magnet. The magnets would not be sufficiently strong to cause the spheres to adhere to each other but the position of the magnets could be measured by any suitable pick-up device within the housing 18 which is responsive to the presence of magnetism. Again the magnets could be omitted from the spheres and the spheres made of a magnetic material with an electromagnetic device positioned within the instrument 18 so that the spheres would vary the magnetic flux of the device depending upon their position with respect thereto.

As will be seen from the foregoing description the essence of the invention is the use of one or more objects of known density disposed within the bore hole fluid so that they will tend to move upwardly or downwardly depending upon the fluid density, with means positioned in known relation to the path of the objects for indicating their position.

Obviously many modifications and variations of the invention as hereinabove set forth may be made without departing from the spirit and scope thereof and therefore only such limitations should be imposed as are indicated in the appended claims.

We claim:

1. A method of determining the density of borehole fluids entering a liquid containing borehole of a producing well from producing formations traversed by the borehole and wherein the fluids being produced at different depths mix with and change the density of the liquid in the borehole opposite the various producing formations, which comprises suspending in the liquid in the borehole at one predetermined depth opposite a producing formation an assembly including a restricted vertical path with an object therein having a known density intermediate the range of densities encountered in the borehole liquid and including a radioactive substance, said object being free to move a fixed distance in said restricted vertical path in response to change in density of the borehole liquid, also suspending in said borehole in known relationship with respect to said path a device for detecting radiations from said object, the value of said detected radiations varying with the position of said object in said restricted path with respect to said detecting device, measuring the resulting detected radiations from said object, then moving said assembly and said detecting device to a second predetermined depth in said borehole while maintaining said above-defined known relationship, and again measuring said detected radiations, said operations being repeated until a change in the position of said object is obtained.

2. A method of determining the density of borehole fluids entering a liquid containing borehole of a producing well from producing formations traversed by the borehole and wherein the fluids being produced at different depths mix with and change the density of the liquid in the borehole opposite the various producing formations, which comprises suspending in the liquid in the borehole at one predetermined depth opposite a producing formation an assembly including a restricted vertical path with a plurality of objects therein having known increasing densities from top to bottom and each including a radioactive substance, said objects being free to move a fixed distance in said restricted vertical path in response to change in density of the borehole liquid, also suspending in said borehole at a fixed relationship with respect to said path a device for detecting radiations from said object, the value of said detected radiations varying with the position of said objects in said restricted path, measuring the resulting detected radiations from said plurality of objects, then moving said assembly and said detecting device to a second predetermined depth in said borehole while maintaining said above-defined fixed relationship and again measuring said detected radiations, said operations being repeated until a change in the detected radiations is obtained.

3. A method of determining the density of borehole fluids entering a liquid containing borehole of a producing well from producing formations traversed by the borehole and wherein the fluids being produced at different depths mix with and change the density of the liquid in the borehole opposite the various producing formations, which comprises suspending in the liquid in the borehole at one predetermined depth opposite a producing formation an assembly including a restricted vertical path with an object therein having a known density intermediate the range of densities encountered in the borehole liquid and including a radioactive substance, said object being free to move a fixed distance in said restricted vertical path in response to change in density of the borehole liquid, also suspending in said borehole at a fixed relationship with respect to said path a plurality of detectors in vertically spaced apart fixed relationship to each other for detecting radiations from said object, the value of said detected radiations varying with the position of said object in said restricted path, measuring the resulting detected radiations from said object, then moving said assembly and said plurality of radiation detectors to a second predetermined depth in said borehole while maintaining said above-defined fixed relationship and again measuring said detected radiations, said operations being repeated until a change in the detected radiations is obtained.

4. A method of determining the density of borehole fluids entering a liquid containing borehole of a producing well from producing formations traversed by the borehole and wherein the fluids being produced at different depths mix with and change the density of the liquid in the borehole opposite the various producing formations, which comprises suspending in the liquid in the borehole at one predetermined depth opposite a producing formation an assembly including a restricted vertical path with a plurality of objects therein having known densities increasing from top to bottom and each including a radioactive substance, said plurality of objects being free to move a fixed distance in said restricted vertical path in response to change in density of the borehole liquid, also suspending in said borehole at a fixed relationship with respect to said path a plurality of detectors in vertically spaced apart fixed relationship with each other for detecting radiations from said object, the value of said detected radiations varying with the position of said objects in said restricted path, measuring the resulting detected radiations from said plurality of objects, then moving said assembly and said plurality of radiation detectors to a second predetermined depth in said borehole while maintaining said above-defined fixed relationship, and again measuring said detected radiations, said operations being repeated until a change in the detected radiations is obtained.

5. Apparatus for determining the density of borehole fluids entering a liquid containing borehole of a producing well from producing formations traversed by the borehole and wherein the fluids being produced at different depths mix with and change the density of the liquid in the borehole opposite the various producing formations, comprising in combination, an assembly including an elongated sealed casing, a radiation detecting device enclosed within said casing, means providing a restricted guide path mounted along one side of the casing on the exterior thereof in fixed relationship to said detecting device, an object freely movable within said guide path means along the restricted length thereof, said object having a known density and including a radioactive substance, said guide path means being open so that said object is exposed to the surrounding borehole fluid on the outside of said casing, means for suspending said assembly in the well bore at a predetermined depth, and means for moving said assembly within said well bore to different predetermined depths.

6. Apparatus for determining the density of borehole fluids entering a liquid containing borehole of a producing well from producing formations traversed by the borehole and wherein the fluids being produced at different depths mix with and change the density of the liquid in the borehole opposite the various producing formations, comprising in combination, an assembly including an elongated sealed casing, a radiation detecting device enclosed within said casing, means providing a restricted guide path mounted along one side of the casing on the exterior thereof in fixed relationship to said detecting device, a plurality of objects freely movable within said guide path means along the restricted length thereof, each of said objects having a known density increasing from top to bottom and including a radioactive substance, said guide path means being open so that said plurality of objects are exposed to the surrounding borehole fluid on the outside of said casing, means for suspending said assembly in a well bore at a pretermined depth, and means for moving said assembly within said well bore to different predetermined depths.

7. Apparatus for determining the density of borehole fluids entering a liquid containing borehole of a producing well from producing formations traversed by the borehole and wherein the fluids being produced at different depths mix with and change the density of the liquid in the borehole opposite the various producing formations, comprising in combination, an assembly including an elongated sealed casing, a plurality of radiation detectors enclosed within said casing in vertically spaced apart fixed relationship to each other, means providing a restricted guide path mounted along one side of the casing on the exterior thereof in fixed relationship to said plurality of detectors, an object freely movable within said guide path means along the restricted length thereof, said object having a known density and including a radioactive substance, said guide path means being open so that said object is exposed to the surrounding borehole fluid on the outside of said casing, means for suspending said assembly in the well bore at a predetermined depth, and means for moving said assembly within said well bore to different predetermined depths.

8. Apparatus for determining the density of borehole fluids entering a liquid containing borehole of a producing well from producing formations traversed by the borehole and wherein the fluids being produced at different depths mix with and change the density of the liquid in the borehole opposite the various producing formations, comprising in combination, an assembly including an elongated sealed casing, a plurality of radiation detectors enclosed within said casing in vertically spaced apart fixed relationship to each other, means providing a restricted guide path mounted along one side of the casing on the exterior thereof in fixed relationship to said plurality of detectors, a plurality of objects freely movable within said guide path means along the restricted length thereof, each of said objects having a known density increasing from top to bottom and including a radioactive substance, said guide path means being open so that said plurality of objects are exposed to the surrounding borehole fluid on the outside of said casing, means for suspending said assembly in the well bore at a predetermined depth, and means for moving said assembly within said well bore to different predetermined depths.

References Cited in the file of this patent
UNITED STATES PATENTS

| | | |
|---|---|---|
| 2,335,409 | Hare | Nov. 30, 1943 |
| 2,453,456 | Piety | Nov. 8, 1948 |
| 2,456,233 | Wolf | Dec. 14, 1948 |